Aug. 21, 1962     C. H. MANSEN     3,050,331
FOLDING TRAILER

Filed July 19, 1960     4 Sheets-Sheet 1

Carl H. Mansen
INVENTOR.

BY *Clarence A. O'Brien*
*and Harvey B. Jacobson*
Attorneys

Aug. 21, 1962

C. H. MANSEN 3,050,331

FOLDING TRAILER

Filed July 19, 1960

Carl H. Mansen
INVENTOR.

BY *Clarence A. O'Brien*
*and Harvey B. Jackson*
Attorneys

Aug. 21, 1962 C. H. MANSEN 3,050,331
FOLDING TRAILER
Filed July 19, 1960 4 Sheets-Sheet 4
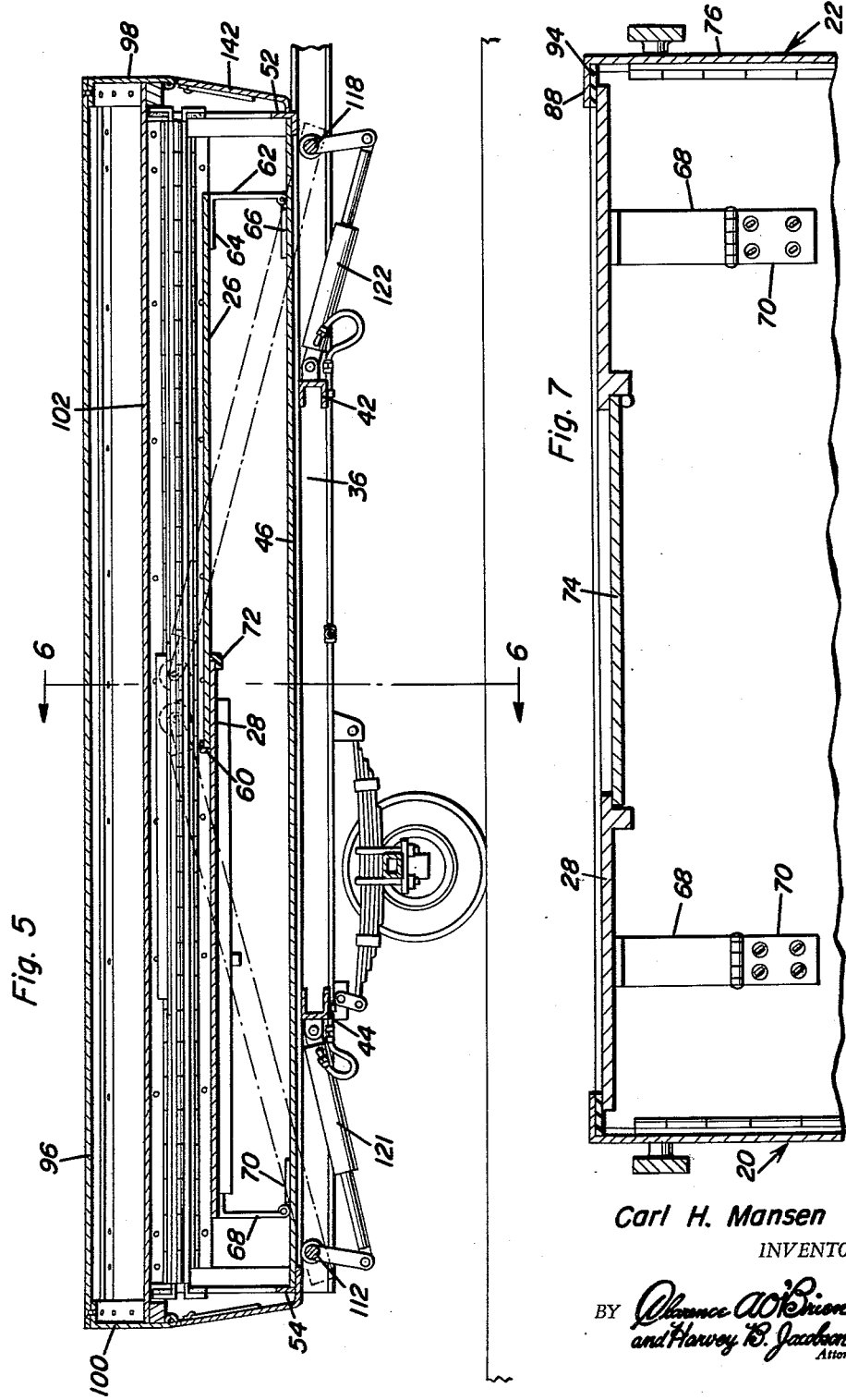
Carl H. Mansen
INVENTOR.

United States Patent Office 3,050,331
Patented Aug. 21, 1962

3,050,331
FOLDING TRAILER
Carl H. Mansen, 11429 Forest Ave., Chicago, Ill.
Filed July 19, 1960, Ser. No. 43,811
4 Claims. (Cl. 296—27)

This invention relates to trailer vehicles of the foldable or collapsible type.

It is therefore a primary object of this invention to provide a collapsible type of trailer wherein the side walls and end walls of the trailer body may be folded inwardly so as to lower the trailer roof over the base portion of the trailer body in protective relation to the inwardly folded parts of the trailer body.

Another object of this invention is to provide a collapsible type of trailer wherein the trailer body is extended or collapsed by means of a hydraulically powered actuating mechanism which by virtue of the arrangement of parts does not interfere with the spatial accommodations provided by the trailer body and which is very effective to raise or lower the trailer roof in order to extend or collapse the trailer body.

The trailer construction of this invention involves a trailer base portion which is mounted in the usual manner on the trailer chassis frame. A pair of side wall assemblies are pivotally connected to the base portion, said side wall assemblies being hinged along their longitudinal center portions so that the side wall assemblies may be folded inwardly across the base portion while the trailer roof is pivotally connected to the top edges of the side wall assemblies so that when the side wall assemblies are folded inwardly the roof will be lowered over the base portion of the trailer body.

The trailer body also includes end walls which are hingedly mounted to the floor of the base portion in such a manner that they may also be folded inwardly above the floor of the base portion and beneath the inwardly folded side wall assemblies. The end walls when extended to their unfolded position will also support the trailer roof adjacent the forward and rear ends thereof so as to maintain the trailer body in its unfolded condition. In order to lower or raise the trailer roof after the end walls have been folded inwardly, lever actuating mechanism is provided which comprises a pair of lever members adjacent each end of the trailer body, the lever members of each pair being interconnected by means of an actuating shaft which is rotatably mounted by the trailer chassis frame beneath the base portion, the upper ends of said lever members having rollers which engage within tracks connected to the outer sides of the roof. Accordingly, the actuating shafts may be rotated and the levers pivoted from a position perpendicular to the base portion and the roof in which case the roof is in its raised position to a lower position in which case the rollers are engaged with the tracks on the roof intermediate the ends of the roof so as to accommodate the position of the roof in its lower position. The lever actuating shafts are rotated by means of hydraulic cylinders and pistons mounted on the chassis frame, the hydraulic cylinders being hydraulically connected to a manually operable pump located on the chassis frame just forwardly of the trailer body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a sectional view taken through a plane indicated by section line 5—5 in FIGURE 2.

FIGURE 7 is a sectional view taken through a plane indicated by section line 7—7 in FIGURE 4.

Figure 1:
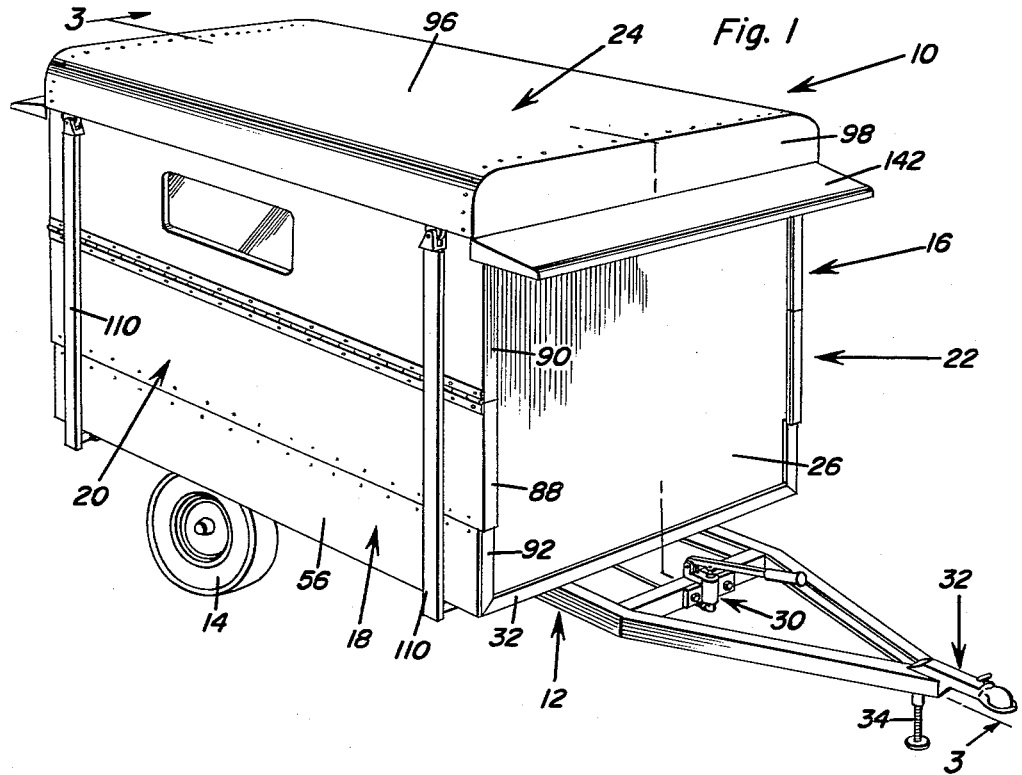
FIGURE 1 is a perspective view of the foldable trailer construction showing the trailer in its unfolded position.
Figure 2:
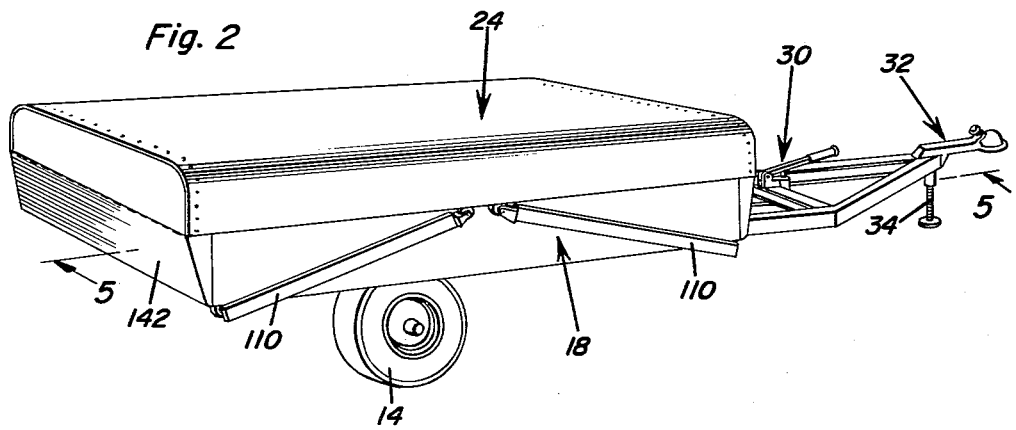
FIGURE 2 is a perspective view of the trailer in its collapsed condition.

Referring to the drawings in detail, reference numeral 10 generally designates the foldable trailer made in accordance with this invention. As seen in FIGURE 1 for example, the trailer 10 includes a wheeled chassis frame generally indicated by reference numeral 12 which is yieldably supported on a pair of vehicle wheels 14 while the trailer body generally designated by reference numeral 16 is mounted on the chassis frame 12. The trailer body 16 includes a base portion generally indicated by reference numeral 18 which is mounted on the chassis frame 12. A pair of side wall assemblies generally indicated by reference numerals 20 and 22 are pivotally connected to the base portion 18 while a roof assembly generally indicated by reference numeral 24 is pivotally connected to the side wall assemblies 20 and 22. The trailer body 16 also includes a forward end wall 26 and a rear end wall assembly 28 most clearly seen in FIGURE 4. Mounted on the chassis frame 12 forwardly of the trailer body 16 is a manually operated pump mechanism 30 which is provided for the purpose of hydraulically raising the roof assembly 24 to the position illustrated in FIGURE 1 for example from the collapsed position illustrated in FIGURE 2 for example. It will also be observed in FIGURES 1 and 2 that the chassis frame 12 includes a forward portion 32 whereby the chassis frame and trailer may be hitched to a vehicle or supported on the ground by means of an adjustable leg 34 as illustrated in FIGURES 1 and 2.

Figure 3:
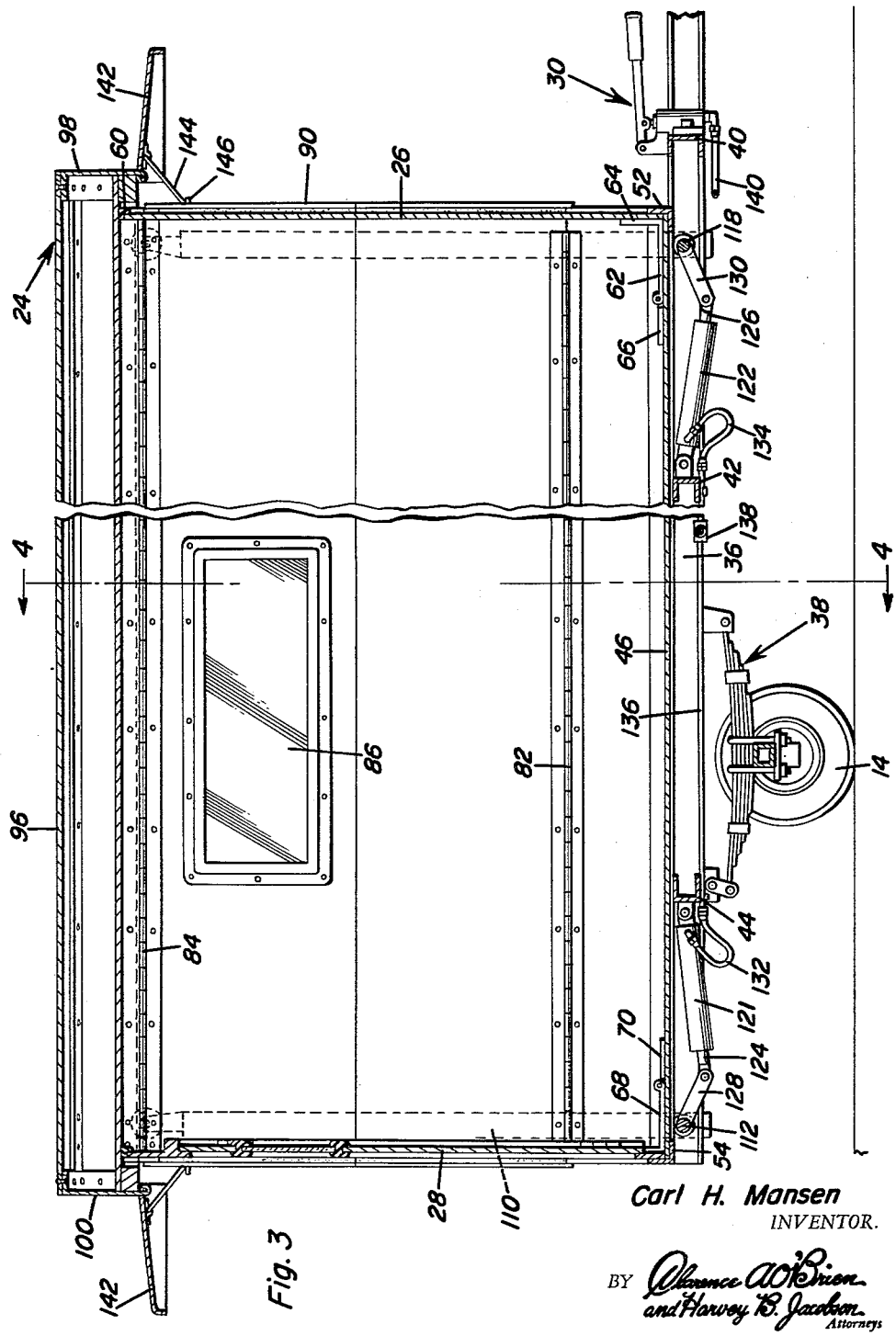
FIGURE 3 is a sectional view taken through a plane indicated by section line 3—3 in FIGURE 1.

Referring now to FIGURE 3 in particular, it will be observed that the wheeled chassis frame 12 includes a pair of parallel channel frame members 36 which are supported on the pair of vehicle wheels 14 by means of a conventional type of leaf spring suspension 38. The chassis frame 12 also includes a plurality of cross channel frame members 40, 42 and 44.

Figure 4:
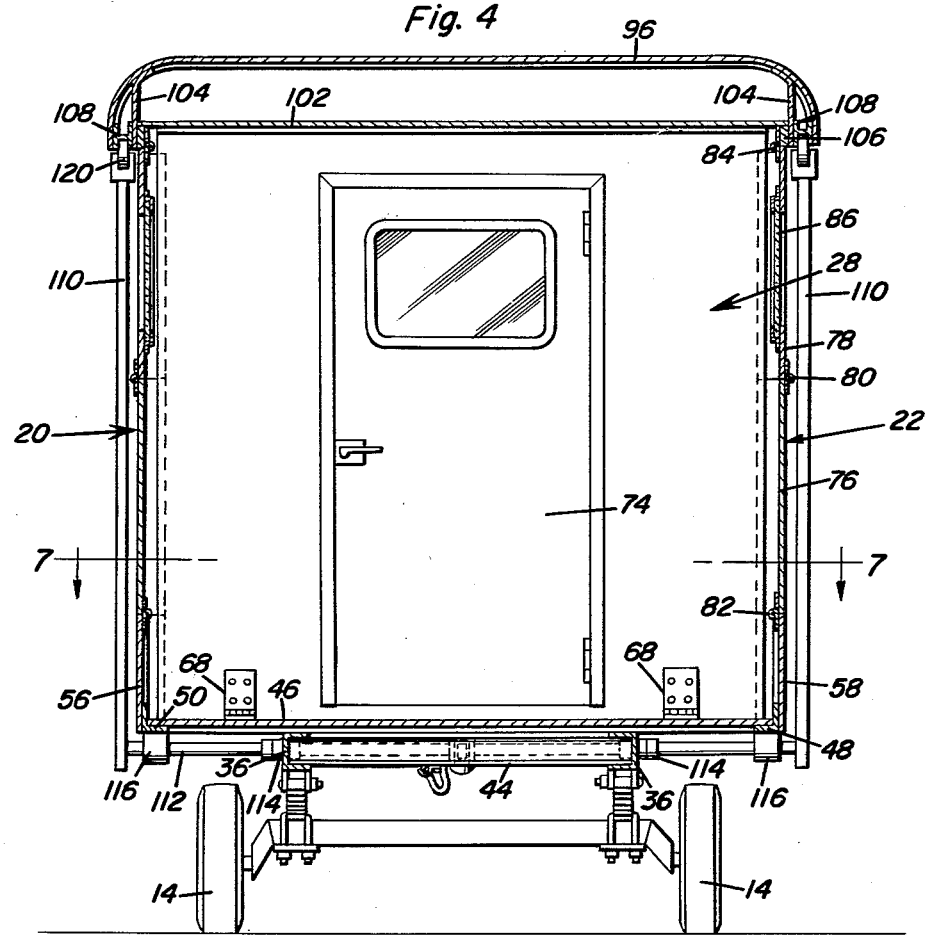
FIGURE 4 is a sectional view taken through a plane indicated by section line 4—4 in FIGURE 3.
Figure 6:
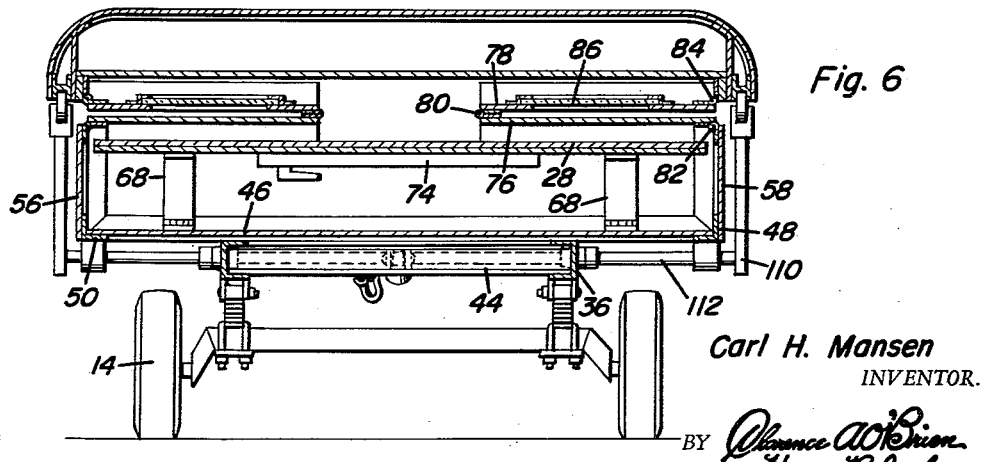
FIGURE 6 is a sectional view taken through a plane indicated by section line 6—6 in FIGURE 5.

The base portion 18 of the trailer body 16 includes a floor member 46 which is disposed on top of the chassis frame members 36 overhanging the cross frame members 44 and 42 as seen in FIGURES 3 and 5. As seen in FIGURES 4 and 6, the floor member 46 is disposed over lower edge angle members 48 and 50 which extend longitudinally along the sides of the floor member 46 while the forward and rear edges of the floor member 46 are disposed over angle members 52 and 54 which are attached to the parallel chassis frame members 36 in any suitable manner as will be apparent in FIGURES 1, 3 and 5. The base portion 18 also has a pair of parallel side members 56 and 58 which are attached to the angle members 50 and 48 respectively as more clearly seen in FIGURES 4 and 6.

The forward end wall 26 as seen in FIGURE 3, when in its unfolded position is disposed perpendicular to the floor 46 and rests up against the forward frame angle member 52. The upper end of the end wall preferably has a yieldable bumper element 60 for engaging the roof assembly 24. At the lower end of the end wall 26 a supporting leg member 62 is attached by means of portion 64 to the inside surface of the end wall 26. The member 62 cooperates with a hinge element 66 which is fastened in any suitable manner to the floor 46 so that when the end wall is moved inwardly to the position illustrated in FIGURE 5, the member 62 will be pivotally displaced so as to position the end wall 26 above the floor 46 in parallel spaced relation thereto. It will of course be appreciated that a pair of such members 62 and hinge elements 66 are provided for hingedly connecting the end wall 26 to the floor 46. The end wall 28 is similarly hinged to the floor 46 by means of a pair of members 68 and hinge elements 70 respectively attached to the end wall 28 and floor 46. As will be observed in FIGURE 5, the end wall 28 in its folded position underlies the end wall 26 and is also provided with a resilient bumper 72 similar to the bumper 60 for the end wall 26. It will also be readily recognized that the end wall 28 also includes a door assembly 74.

The side wall assemblies 20 and 22 it will be observed are similar in construction to each other so that a more detailed description of side wall assembly 22 will apply equally to the construction of side wall assembly 20. Referring therefore to FIGURES 3, 4 and 6 it will be observed that the side wall assembly 22 is made up of a lower section 76 which is pivotally connected to an upper section 78 by means of a longitudinally extending hinge 80. The lower section 76 of the side wall assembly 22 is hingedly connected to the side member 58 by means of a hinge 82 disposed parallel to the hinge 80 but secured to the section 76 and side member 58 on the inner side thereof whereas the hinge 80 is connected to the outer side of the lower section 76 and upper section 78. The upper section 78 is pivotally connected to the roof assembly 24 by means of a hinge 84 which is also connected on the inside surfaces of the parts. The hinges 80, 82 and 84 are disposed parallel to each other and are so arranged that when the trailer body 16 is in its collapsed condition as seen in FIGURE 6, the upper and lower sections 78 and 76 will pivot about their hinges 80, 82 and 84 so as to fold inwardly as indicated in FIGURE 6. The upper and lower sections 78 and 76 of the side wall assembly are similar to each other except that a window 86 is mounted in the upper section 78. The upper and lower sections of the side wall assemblies at their forward and rear ends include integral end portions disposed perpendicular to the wall sections such as portions 88 and 90 as seen more clearly in FIGURE 1. It will also be observed that attached to the side members 56 and 58 of the base portion 18 are end members 92 as also more clearly seen in FIGURE 1. The end members 88, 90 and 92 on the side wall assemblies and the side members of the base portion respectively are provided for the purpose of limiting outward movement of the end wall members 26 and 28 and as more clearly seen in FIGURE 7 and are provided with a liner or weather strip 94 so as to seal the trailer body from the weather. The unfolded side wall assemblies may thereby be locked in unfolded condition by the end wall members.

The roof assembly 24 includes a top portion 96 which is curved at the sides thereof and fitted thereby over end portions 98 and 100 to which it is fastened in any suitable manner as for example by rivets. The roof assembly 24 also includes a trailer ceiling member 102 which is disposed parallel to the top 96 and spaced therebelow. The ceiling member 102 is connected to the roof top 96 by means of a pair of hanger elements 104 as seen in FIGURE 4 for example which also extend below the ceiling member 102 and have connected thereto a mounting strip 106 for the hinge members 84 by means of which the upper sections 78 of the side wall assemblies 20 and 22 are connected. Also, disposed between the hanger members 104 and the lower edge portion of the roof top 96 are a pair of track elements 108 which are thereby fastened to the roof assembly 24. The track elements 108 accordingly face downwardly in spaced parallel relation to the side wall assemblies 20 and 22 on both outer sides thereof.

The actuating mechanisms are accordingly provided for engagement with the track element 108 on the roof assembly 24 for the purpose of raising and lowering the roof assembly. Therefore, two pairs of actuating lever members are provided adjacent the forward and rear ends of the trailer body 16, each of said lever members being identical in construction and indicated by reference numeral 110 in the drawing. As seen for example in FIGURE 4, the rear pair of lever members 110 are interconnected at their lower ends by means of an actuating shaft 112 which is rotatably mounted by means of journal bearings 114 on the frame members 36 of the chassis frame 12. The actuating shaft 112 may also be journaled in hangers 116 suspended from the bottom of the trailer base portion 18. A similar actuating shaft 118 is provided adjacent the forward end of the trailer body 16 also journaled by means of the chassis frame 12 for actuation of the pair of levers 110 connected thereto. It will therefore be appreciated, that the lever members 110 may be actuated by rotation of the actuating shafts 112 and 118 from a vertical column support position illustrated in FIGURE 1 to a lowered position illustrated in FIGURE 2. Accordingly, rollers 120 are rotatably mounted by the levers 110 at their upper ends for engagement within the track elements 108 on the roof assembly 24 so that the roof may be raised or lowered between the positions illustrated in FIGURES 1 and 2.

Hydraulic power mechanism is therefore provided for the purpose of simultaneously rotating the actuating shafts 112 and 118 for the purpose hereinabove indicated. Accordingly, a pair of cylinder members 121 and 122 are mounted beneath the trailer body 16 on the chassis frame 12 by being pivotally connected to the cross frame members 44 and 42 respectively as seen in FIGURE 3 for example. The cylinder members 121 and 122 slidably mount piston rods 124 and 126 respectively which are pivotally connected to crank arms 128 and 130 which in turn are rigidly connected to the actuating shafts 112 and 118 respectively intermediate the ends of the actuating shafts. Hydraulic fluid is therefore admitted to the cylinders 121 and 122 for the purpose of expanding the volume therein so as to force the piston members 124 and 126 outwardly therefrom causing the crank arms 128 and 130 to rotate clockwise and counterclockwise respectively as viewed in FIGURE 3 to thereby cause the lever members 110 to rotate in opposite directions from their dotted position shown in FIGURE 3 to the dotted position shown in FIGURE 5. Fluid under pressure is therefore admitted to the cylinders by means of flexible conduits 132 and 134 connected respectively to the cylinders 121 and 122, said flexible conduits being interconnected by means of a fluid conduit 136 to which a fitting 138 is connected. An inlet conduit 140 connected to the discharge port of the pump mechanism 30 is therefore connected to the fitting 138 for the purpose of supplying fluid under pressure to the conduit 136 to thereby supply the hydraulic cylinders 121 and 122. It will therefore be appreciated that the trailer body may be raised to its unfolded condition by pumping the pump mechanism 30.

It will be observed in FIGURES 3 and 5, that pivotally connected to each end of the roof assembly 24 are a pair of shield members 142 which may be maintained extended outwardly from the roof assembly as illustrated in FIGURE 3 when the trailer body is in its unfolded condition. As illustrated in FIGURE 3 therefore the shield members 142 are held in their outward position by means of a latch element 144 engaging an abutment 146 on the end portions 90 on the upper sections of the side wall members. In the folded condition of the trailer body however, the shield members 142 as more clearly seen in FIGURE 5 are released so that they will depend downwardly and thereby close the otherwise exposed ends between the side members 56 and 58 of the base portion 18.

From the foregoing description, operation and utility of the foldable trailer made in accordance with this invention will be apparent. It will therefore be appreciated, that the trailer body may be folded inwardly into a fully collapsed condition and be completely protected in said condition between the base portion 18 and the roof assembly 24 in a most unique and highly efficient manner. It will also be appreciated that by a simple and highly effective manner the roof assembly may be raised relative to the base portion 18 so as to unfold thereby the side wall assemblies. It will therefore be observed that when the actuating levers 110 are in the unfold position for the trailer body they are disposed perpendicular to the frame so as to offer utmost supporting rigidity for the roof assembly. Also, the end walls may then be unfolded into their upright positions locked against outward movement by the end portions of the side wall assemblies and thereby lock the trailer body in its unfolded condition. The power operated actuating mechanism is therefore efficiently disposed so as to avoid interference with the spatial accommodations of the trailer body and also present a pleasing appearance from an aesthetic standpoint for both the folded and unfolded conditions of the trailer body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible trailer comprising, a wheeled frame means carrying open end bottom means having a floor and side members attached thereto, trailer roof means adapted to be raised and supported above said side members, inwardly foldable side wall means pivotally connecting said side members and roof means, end wall means hingedly connected to said floor and foldable inwardly to a position parallel to and spaced above said floor, said side wall means being foldable to a position above said end wall means when in folded position, and column support means mounted in fixed relation on said frame means exteriorly of the side wall means and engageable with said roof means for raising thereof and for support thereof when said column support means is in vertical position, said end wall means when unfolded contributing to the support of said roof means on the floor of the bottom means and acting thereby to lock said side wall means in unfolded position, said column support means including lever means pivotally mounted on said frame means adjacent each end of the bottom means, roller means mounted on upper ends of said lever means and engageable with track means connected to said roof means, and power actuating means mounted on said frame means beneath said floor and operatively connected to said lever means for actuation thereof from a collapsed position wherein said roller means are engageable with the track means intermediate forward and rear ends of said roof means, to a raised position wherein the lever means are disposed perpendicular to the roof means engaging said track means adjacent forward and rear ends of said roof means, said power actuating means including hydraulic motor means mounted on said frame means and connected to said lever means and pump means mounted on said frame means forwardly of said bottom means and hydraulically connected to said motor means, said roof means in collapsed position enclosing said end wall means and side wall means between the side members of said bottom means and end shield means pivotally connected to said roof means and foldable downwardly over forward and rear ends of said side members for complete enclosure of the foldable side and end wall means.

2. The trailer as defined in claim 1, wherein said track means are spaced outwardly and above said side members and said lever means include lever members on each outer side of said side members interconnected by actuating shafts rotatably mounted by the frame means beneath the floor and crank means connected to said shafts and to said hydraulic motor means.

3. A collapsible trailer comprising, a wheeled frame means carrying open end bottom means having a floor and side members attached thereto, trailer roof means adapted to be raised and supported above said side members, inwardly foldable side wall means pivotally interconnecting said side members and roof means, end wall means hingedly connected to said floor and foldable inwardly to a position parallel to and spaced above said floor, said side wall means being foldable to a position above said end wall means when in folded position, and column support means mounted in fixed relation on said frame means exteriorly of the side wall means and engageable with said roof means for raising thereof and for support thereof when said column support means is in vertical position, said end wall means when unfolded contributing to the support of said roof means on the floor of the bottom means and acting thereby to lock said side wall means in unfolded position, said roof means in collapsed position enclosinng said end wall means and side wall means between the side members of said bottom means, and end shield means pivotally connected to said roof means and foldable downwardly over forward and rear ends of said side members for complete enclosure of the foldable side and end wall means.

4. A collapsible trailer comprising, a wheeled frame means mounting a trailer body including a base, inwardly foldable side walls pivotally connected to said base, and a trailer roof pivotally connected to said side walls including track means on the roof and located on both outer sides of the side walls in spaced relation thereto and actuating means rotatably mounted on said frame means and extending upwardly therefrom on both outer sides of said side walls into engagement with said track means for raising and lowering the roof for respectively unfolding and collapsing the side walls, said actuating means including lever members interconnected by actuating shafts rotatably mounted by the frame means beneath said base, crank means connected to said shafts, hydraulic piston means mounted on said frame means between said shafts and connected to said crank means and manually operable pump means mounted on said frame means forwardly of said trailer and hydraulically connected to said piston means.

References Cited in the file of this patent

UNITED STATES PATENTS

| | | |
|---|---|---|
| 1,863,206 | Quinn | June 14, 1932 |
| 1,917,824 | Burns | July 11, 1933 |
| 2,298,619 | Gorton | Oct. 13, 1942 |
| 2,483,332 | Brumbaugh | Sept. 22, 1949 |
| 2,729,497 | Runyan | Jan. 3, 1956 |
| 2,795,363 | Turner | June 11, 1957 |
| 2,808,287 | Eberly | Oct. 1, 1957 |
| 2,837,778 | Kern | June 10, 1958 |

FOREIGN PATENTS

| | | |
|---|---|---|
| 822,562 | Great Britain | Oct. 28, 1959 |